(12) United States Patent
Lin et al.

(10) Patent No.: US 7,122,106 B2
(45) Date of Patent: Oct. 17, 2006

(54) ELECTROSYNTHESIS OF NANOFIBERS AND NANO-COMPOSITE FILMS

(75) Inventors: Yuehe Lin, Richland, WA (US); Liang Liang, Fontana, CA (US); Jun Liu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 449 days.

(21) Appl. No.: 10/154,935

(22) Filed: May 23, 2002

(65) Prior Publication Data

US 2003/0217928 A1 Nov. 27, 2003

(51) Int. Cl.
| C25B 1/00 | (2006.01) |
| C25B 3/00 | (2006.01) |
| C25D 15/00 | (2006.01) |
| C25D 5/48 | (2006.01) |
| C25D 11/00 | (2006.01) |

(52) U.S. Cl. ............ 205/109; 205/118; 205/205; 205/210; 205/220; 205/317; 205/334; 205/413

(58) Field of Classification Search ............ 205/109, 205/118, 159, 164, 205, 210, 220, 317, 334, 205/413

See application file for complete search history.

(56) References Cited

U.S. PATENT DOCUMENTS

| 4,451,348 A | 5/1984 | Itaya et al. ............ 204/290 R |
| 5,282,955 A * | 2/1994 | Leventis et al. ............ 205/317 |
| 5,876,581 A | 3/1999 | Itaya et al. ............ 205/316 |
| 5,938,917 A | 8/1999 | Mulchandani ............ 205/782 |

FOREIGN PATENT DOCUMENTS

| DE | 4114464 | | 2/1992 |
| JP | 05051793 A | * | 3/1993 |
| WO | WO 95/21934 | | 8/1995 |
| WO | WO 01/51690 | | 7/2001 |
| WO | WO 01/70873 | | 9/2001 |

OTHER PUBLICATIONS

Cataldi et al., "Voltammetric and XPS investigations of polynuclear ruthenium-containing cyanometallate film electrodes." *Journal of Electroanalytical Chemistry* 406:91-99 (1996), no month.

Chen et al., Catalyst-free and controllable growth of $SiC_xN_y$ nanorods. *Journal of Physics and Chemistry of Solids* 62:1567-1576 (2001), no month.

(Continued)

*Primary Examiner*—Edna Wong
(74) *Attorney, Agent, or Firm*—Klarquist Sparkman, LLP (57) ABSTRACT

A method for producing an array of oriented nanofibers that involves forming a solution that includes at least one electroactive species. An electrode substrate is brought into contact with the solution. A current density is applied to the electrode substrate that includes at least a first step of applying a first substantially constant current density for a first time period and a second step of applying a second substantially constant current density for a second time period. The first and second time periods are of sufficient duration to electrically deposit on the electrode substrate an array of oriented nanofibers produced from the electroactive species. Also disclosed are films that include arrays or networks of oriented nanofibers and a method for amperometrically detecting or measuring at least one analyte in a sample.

55 Claims, 8 Drawing Sheets

OTHER PUBLICATIONS

Cosgrove et al., "Chemically Immobilised Enzyme Electrodes for Hydrogen Peroxide Determination." *Analyst* 113:1811-1815 (1988), no month.

DeVito et al., "Forward Colloidal Dispersions of Template-Synthesized Polypyrrole Nanotubules", Chem. Mat., vol. 10, No. 7, pp. 1738-1741 (1998), no month.

Doshi et al., "Electrospinning Process and Applications of Electrospun Fibers." *Journal of Electrostatics* 35:151-160 (1995), no month.

Ellis et al., "Electrochromism in the Mixed-Valence Hexacyanides. Voltammetric and Spectral Studies of the Oxidation and Reduction of Thin Films of Prussian Blue." *J. Phys. Chem.* 85:9. pp. 1225-1231 (1981), no month.

Feldman et al., "Ion Flux During Electrochemical Charging of Prussian Blue Films." *J. Electroanal. Chem.* 234:213-227 (1987), no month.

Funk et al., "Determination of Peroxides by High Performance Liquid Chromatography with Amperometric Detection." *Anal. Chem.* 52:4, pp. 771-773 (1980), no month.

Gao et al., "Aligned Coaxial Nanowires of Carbon Nanotubes-Sheathed with Conducting Polymers." *Angew. Chem. Inc. Ed.* 39:20, pp. 3664-3666 (2000), no month.

Garjonyte et al., "Electrocatalytic reactions of hydrogen peroxide at carbon paste electrodes modified by some met al hexacynoferrates." *Sensors and Actuators B* 46:236-241 (1998), no month.

Guilbault et al., "An Enzyme Electrode for the Amperometric Determination of Glucose." *Analytica Chimica Acta* 64:423-455 (1973), no month.

He et al., "Electrochemical potential controlled electron transport in conducting polymer nanowires." *Appl. Physics. Lett* 77:3995 (2000), no month.

Huang et al., "Nanowire and Nanodisk arrays by Liquid-Crystal Template Electrodeposition." *Liquid Phase Synthesis of Nanomaterials presented Nov. 9, 2001* (Abstract).

Huang et al., "Room-Temperature Ultraviolet Nanowire Nanolasters." *Science* 292:1897-1899 (2001), no month.

Huexko, "Template-based synthesis of nanomaterials." *Appl. Phys. A* 70:365-376 (2000), no month.

Ikeda et al., "Polypyrrole film electrodes electrochemically doped with colloidal Prussian Blue." *J. Electroanal. Chem.* 265:323-327 (1989), no month.

Itaya et al., "Spectroelectrochemistry and Electrochemical Preparation Method of Prussian Blue Modified Electrodes," *J. Am. Chem. Soc.* 104:18. pp. 4767-4772 (1982), no month.

Itaya et al., "Mediated Electron Transfer Reactions between Redox Centers in Prussian Blue and Reactants in the Solution." *J. Phys. Chem.* 87:1. pp. 105-112 (1983), no month.

Itaya et al., "Electrochemistry of Polynuclear Transition Met al Cyanides: Prussian Blue and Its Analogues." *Acc. Chem. Res.* 19:162-168 (1986), no month.

Karyakin et al., "Prussian Blue-Based First-Generation Biosensor. A Sensitive Amperometric Electrode for Glucose." *Anal. Chem.* 67:14. pp. 2419-2423 (1995), no month.

Koneki et al., "Composite Films of Prussian Blue and N-Substituted Polypyrroles: Fabrication and Application of Optical Determination of pH." *Anal. Chem.* 70:13, pp. 2544-2550 (1998), no month.

Kuhnhardt. "Nucleation and growth of Prussian Blue films on glassy carbon electrodes." *Journal of Electroanalytical Chemistry* 369:71-78 (1991), no month.

Li et al., "Large-Scale Synthesis of Aligned Carbon Xanotubes." *Science* 274:1701-1703 (1996), no month.

Lin et al., "Integrated Microfluidics/Electrochemical Sensor Ssystem for Monitoring of Environmental Exposures to Lead and Chlorophenols." *Biomedical Microdevices*. 314. pp. 331-338 (2001), no month.

Lin et al., "Selective Sorption of Cesium Using Self-Assembled Monolayers on Mesoporous Supports." *Environ. Sci. Technol.* 35:19, pp. 3962-3966 (2001), no month.

Lundgren et al., "Observations on the Composition of Prussian Blue Films and Their Electrochemistry," *Inorg. Chem.* 27:5, pp. 933-939 (1988), no month.

Marinakos et al., "Template Synthesis of One-Dimensional Au. Au-Poly(pyrrole). and Poly(pyrrole) Nanoparticle Arrays." *Chem. Mater.* 10:5. pp. 1214-1219 (1998), no month.

Mortimer et al., "electrochemical Polychromicity in Iron Hexacyanoferrate Films, and a New Film Form of Ferric Ferriecyanide." *J Electroanal. Chem.* 151:133-147 (1983), no month.

Neff, "Electrochemical Oxidation and Reduction of Thin Films of Prussian Blue." *J. Electrochem. Soc.* 125:6, pp. 886-887 (1978), no month.

Noël., Composite films of Iron (III) hexacyanoferrate and poly(3. 4-ethylenedioxythiophene): electrosynthesis and properties. *Journal of Electroanalytical Chemistry* 489:46-54 (2000), no month.

Ogura et al., "Mediated Activation and Electroreduction of $CO_2$ on Modified Electrodes with Conducting Polymer and Inorganic Conductor Films." *J. Electrochem. Soc.* 142:12. pp. 4026-4032 (1995), no month.

Randrianamahazaka et al., "Nucleation and growth of poly(3.4-ethylenedioxythiophene) in acetonitrile on platinum under potentiostatic conditions." *Journal of Electroanalytical Chemistry* 472:103-111 (1999), no month.

Rassat et al., "Development of an electrically switched ion exchange process for selective ion separation." *Separation and Purification Technology* 15:207-222 (1999), no month.

Ren et al., "Synthesis of Large Arrays of Well-Aligned Carbon Nanotubes on Glass." *Science* 282:1105-1107 (1998), no month.

Reneker et al., "Bending instability of electrically charged liquid jets of polymer solutions in electrospinning." *Journal of Applied Physics* 87:9, pp. 4531-4547 (2000), no month.

Roig et al., "Voltammetric Study on the Stability of Deposited Prussian Blue Films Against Successive Potential Cycling." *Electrochimica Acta* 39:3, pp. 437-442 (1194), no month.

Stiwell et al., "Electrochemical studies of the factors influencing the cycle stability of Prussian Blue Films." *Journal of Applied Electrochemistry* 22:325-331 (1992), no month.

Vayssieres et al., "Purpose-Built Anisotropic Metal Oxide Material: 3D Highly Oriented Microrod Array of ZnO." *J. Phys. Chem. B.* 105:17, pp. 3350-3352 (2001), no month.

Zadronecki et al., "Study of Growth and the Electrochemical Behavior of Prussian Blue Films Using Electrochemical Quartz Crystal Microbalance." *Journal of The Electrochemical Society* 146:2. pp. 620-627 (1999), no month.

Bunker, et al., *Science*, vol. 264, p. 48 (1994), no month.

Adeloju et al., *Analyst*, vol. 121, pp. 699-703 (1996), no month.

Choi et al., *synthetic Metals*, vol. 99, pp. 253-256 (1999), no month.

Doblhofer et al., *Handbook of Conducting Polymers*, 2nd ed., Chap. 20, Marcel Dekker, Inc., New York, New York (1998), no month.

MacDiarmid et al., *Reviews of Modern Physics*, vol. 73, pp. 701-712 (2001), no month.

Mann et al., *Science*, vol. 261, pp. 1286-1292 (1993), no month.

O'Halloran et al., *Talanat*, vol. 55, pp. 605-611 (2001), no month.

Tarasevich et al., *Chem. Mater.*, vol. 8, pp. 292-300 (1996), no month.

Vayssieres et al., *Chem. Mater.*, vol. 13, No. 12, pp. 4395-4398 (2001), no month.

\* cited by examiner

ELECTROSYNTHESIS OF NANOFIBERS AND NANO-COMPOSITE FILMS

STATMENT OF GOVERNMENT SUPPORT

This invention was made with United States Government support under Contract DE-AC0676RL01830 awarded by the U.S. Department of Energy. The Unites States Government has certain rights in the invention.

FIELD

The present disclosure relates to the synthesis of nanofibers and films made from the nanofibers.

BACKGROUND OF THE DISCLOSURE

Many methods have been reported for preparing oriented nanostructures, but most of these methods cannot be applied to organic polymer materials. Oriented carbon nanotubes are prepared through chemical vapor deposition (CVD). Large arrays of oriented carbon nanotubes were grown from catalyst particles immobilized on porous silica or glass substrates (Li et al., Science, 274, 1996; and Ren et al., Science, 282, 1150, 1998). A gas phase reaction or similar high temperature reactions have been used to prepare oriented nanorods of ZnO (Huanh et al., Science, 292, 1897, 2001), Si (Yu et al., Physica. E., 9, 305, 2001), and silicon carbide/nitride (Chen et al., J. Phys. Chem. of Solids, 62, 1567, 2001). A solution based synthesis method has been developed to prepare oriented nanorods of $ZnO_2$ using a hydrothermal process (Vayssieres et al., Phys. Chem. B, 105, 3350, 2001).

Another widely investigated approach to prepare oriented nanoscale materials is through templated synthesis, in which an inert nonconductive substrate material with oriented nanoporosity is used as the mold or template (Huczko, Appl. Phys. A, 70, 365, 2000). The template nanoporosity is filled with the desired material. Subsequently, the substrate is partially or completely removed leaving a residue of the desired material that replicates the nanostructure of the template. Some of the mostly widely used templates include filtration membranes (e.g., polycarbonate films) and anodic alumina membranes.

The templated method was also used to prepare oriented rods or tubes of polypyrrole and polyaniline (De Vito et al., Chem. Mater., 10, 1738, 1998; and Marinakos et al., Chem. Mater., 10, 1214, 1998). Recently Gao et al. (Angew. Chem. Int. Ed., 39, 3664, 2000), used oriented carbon nanotubes prepared by a CVD process as the template to electrochemically deposit a thin polyaniline polymer coating on the surface of the carbon nanotubes. This method produced a carbon nanotube/polyaniline composite with reportedly good electrical conductivity and electrochemical activity.

Electrospinning has also been used for preparing conducting polymer nanofibers (Doshi et al., J. Electros., 35, 151, 1999; and Reneker et al., J. Appl. Phys., 87, 4531, 2000). In electrospinning, a high voltage is applied to the tip of a syringe until a jet is produced. The charged polymers in the jet repel each other to form thin fibers.

Despite all of these efforts, a need continues to exist for synthesis methods for controlling the morphology of nanostructures, particularly those made from conducting polymers. Ideally, a nanostructure synthesis would be templateless and involve liquid phase processing that can be used as the reaction medium for a wide variety of materials.

One class of conducting material that has attracted increasing attention are polynuclear transition metal hexacyanometallates by virtue of their electronic, electrochemical, and spectrochemical properties. Electrodes formed from films of hexacyanometallates have been made, but their instability and electrical properties remains a critical issue. For example, composite modified electrodes have been made with conducting polymer films that include iron (III) hexacyanoferrate (also known as "Prussian blue") as a dopant or inorganic conductor (Ogura et al., J. Electrochem. Soc., 142, 4026, 1995; Koncki et al., Anal. Chem., 70, 2544, 1998; and Ikeda et al., J. Electroanal. Chem., 489, 46–54, 2000). Composite films made from polyaniline and iron (III) hexacyanoferrate are described in U.S. Pat. No. 5,282,955 (Leventis et al.). Leventis et al. does not describe a synthesis method for controlling the morphology of composites to produce an oriented nanostructure and the electrochemical deposition of the polyaniline is accomplished by quickly cycling (e.g., from 10–1000 millivolts/second) the electrode between two voltages. Composite films made from poly(3,4-ethylenedioxythiophene) and iron (III) hexacyanoferrate are described in Noel et al., "Composite films of iron (III) hexacyanoferrate and poly(3,4-ethylenedioxythiophene)", Journal Electroanalytical Chemistry 489, 46–54 (2000). Noel et al. does not describe a synthesis method for controlling the morphology of composites to produce an oriented nanostructure and the electrochemical deposition of the poly(3,4-ethylenedioxythiophene) is accomplished by quickly stepping the voltage to increasingly higher voltages.

One application of iron (III) hexacyanoferrate-modified electrodes is in the construction of biological and chemical sensors. More specifically, there is an increasing need for more sensitive and selective detection or measurement of peroxide compounds in clinical, pharmaceutical, food, industrial, and environmental applications. For example, amperometric determination of hydrogen peroxide is of great importance, inspired by the wide use of peroxide sensors in bioanalytical systems based on oxidase-type enzymes. In oxidase-catalyzed reactions, oxygen and hydrogen peroxide are the substrate and product, respectively. Hydrogen peroxide determination is also important to ensure the safety and quality of pharmaceutical and cosmetic formulations. In addition, monitoring of organic (hydro)peroxides formed during the reaction of ozone with organic compounds in the atmosphere and drinking water or directly released into the environment from numerous industrial processes is desirable because of their adverse health effects.

Amperometric determinations of peroxides are generally performed by oxidation at +0.6 to +0.7 V vs. Ag/AgCl on a platinum electrode (for $H_2O_2$) (Guilbault et al., Anal. Chim. Acta 64, 439–455, 1973) or by reduction at −0.3 to −1.0 V vs. Ag/AgCl on gold/mercury amalgam or glassy carbon electrode (for organic and lipid hydroperoxides) (Cosgrove et al., Analyst, 113, 1811–1815, 1988; Funk et al., Anal. Chem., 52, 773–774, 1980). At such large overpotentials, substances present in biological samples such as ascorbic acid, uric acid and acetaminophen interfere under oxidation conditions, while oxygen, benzoquinone, and nitrobenzene interfere at such reduction potentials. Low selectivity, therefore, is a major limitation in amperometric determinations.

One approach for addressing this problem is to use selective electrocatalysts that lower an overpotential of hydrogen peroxide electrooxidation to an appropriate level that prevents the discharge of other substances at the applied electrode potential. Iron (III) hexacyanoferrate has been identified as a possible selective electrocatalyst. For example, Garjonyte et al., *Sensors and Actuators* B 46, 236–241 (1998) describe a carbon paste electrode modified by ferrous hexacyanoferrate that electrocatalyzed the cathodic reduction of hydrogen peroxide. Karyakin et al., "Prussian Blue-Based First-Generation Biosensor, A Sensitive Amperometric Electrode for Glucose", *Anal. Chem.*, 67, 2419–2423, 1995, describe a glucose amperometric biosensor made by glucose oxidase immobilization onto a Prussian blue-modified electrode with a perfluorosulfonate ionomer (Nafion® membrane) layer. In the sensors described by Garjonyte et al. and Karyakin et al. the Prussian blue sensing sites are only accessible by the analyte on a two-dimensional electrode surface and, thus, miniaturization of the sensor is difficult due to the limited total sensing surface area.

SUMMARY OF THE DISCLOSURE

Disclosed herein are various electrosynthesis methods for controlling the morphology of nanostructures. In particular, there are described methods for producing an array of oriented nanofibers. According to one variant, a solution is formed that includes at least one electroactive species. An electrode substrate is brought into contact with the solution. A current is applied to the electrode substrate that includes at least a first step of applying a first substantially constant current density for a first time period and a second step of applying a second substantially constant current density for a second time period. The first and second time periods are of sufficient duration to electrically deposit on the electrode substrate an array of oriented nanofibers produced from the electroactive species.

In another variant, the electroactive species may be an organic monomer. The first substantially constant current density is applied for a first time period to deposit seed nuclei of an electroactive polymer on the electrode substrate, wherein the electroactive polymer is produced from the organic monomer. The second substantially constant current density is applied for a second time period to grow organic polymer nanofibers from the deposited seed nuclei.

A further approach involves depositing substantially spherical particles on an electrode substrate, forming a solution that includes at least one electroactive species, contacting the solution and the electrode substrate, and electrodepositing the electroactive species on the electrode substrate to produce an array of nanofibers.

Also described is a method of producing a film on a substrate that includes applying to an electrode substrate an electrical current regime that includes successive steps of successively reduced current amounts under conditions sufficient to electrochemically deposit a film on the electrode substrate.

A further method of forming a film on a substrate involves electrodepositing a nanoporous array of oriented nanofibers on a substrate. A second substance is electrodeposited within the nanopores of the nanoporous array to form a film.

Nanofiber arrays and films are also described in addition to the methods identified above. For example, there is disclosed a substrate defining at least one surface having deposited thereon an array of freestanding oriented organic polymer nanofibers, wherein the array was produced by liquid phase processing and without a template. Also described is a film comprising a network of three-dimensionally oriented conducting polymer nanofibers, wherein the individual nanofibers have a substantially uniform cylindrical shape and there is substantially no branching of the individual nanofibers. The film may be a composite film wherein the nanofiber network defines nanometer-sized voids into which a second substance is at least partially received.

The composite film may be used to modify an electrode to produce a chemical or biological sensor. For example, there is described a method for amperometrically detecting or measuring at least one analyte in a sample. An electrode is provided that is at least partially coated with a composite film that includes an oriented nanoporous conducting polymer matrix and a metal hexacyanometallate at least partially dispersed within the oriented nanoporous conducting polymer matrix. An electrical potential is applied to the electrode and the sample is contacted with the electrode under conditions sufficient to amperometrically detect the analyte.

An additional application for the composite film is in the separation of cesium ions from a mixture.

The disclosed methods, arrays, films, and devices will become more apparent from the following detailed description of several embodiments.

BRIEF DESCRIPTION OF THE DRAWINGS

Certain embodiments will be described in more detail with reference to the drawings described below.

FIG. 1A shows a perpendicular top view at 10,000× magnification; FIG. 1B shows a perpendicular top view at 30,000× magnification; FIG. 1C shows a top view of a sample tilted at about 40° at 10,000× magnification; and FIG. 1D shows a top view of a sample tilted at about 40° at 30,000× magnification. A scale bar is included at the bottom right hand corner of FIGS. 1A–1D.

FIG. 3A shows a top view of one sample area tilted at about 40° at 10,000× magnification; FIG. 3B shows a perpendicular top view at 30,000× magnification; FIG. 3C shows a top view of another sample area tilted at about 40° at 10,000× magnification; and FIG. 3D shows a top view of a sample tilted at about 40° at 30,000× magnification.

FIG. 4 is a graphical depiction of cyclic voltammograms of different polyaniline film morphologies. Curve (a) represents oriented polyaniline nanofibers on a Pt substrate synthesized according to methods disclosed herein, (b) represents oriented polyaniline nanofibers on silica spheres synthesized according to methods disclosed herein, and (c) represents a conventional polyaniline film deposited without the step-wise current process. The y-axis depicts the redox currents generated by oxidation/reduction of polyaniline. The x-axis depicts the voltage applied to the working electrode.

DETAILED DESCRIPTION OF SEVERAL EMBODIMENTS

For ease of understanding, the following terms used herein are described below in more detail:

"Nanometer" or "nanometer-sized" denotes a material or construct whose largest dimension is less than one micron.

"Oriented nanofibers" indicates that substantially all nanofibers in a specific structure or array are arranged parallel to each other in a longitudinal direction ("unidirectionally oriented") or in a well-defined three-dimensional network ("three-dimensionally oriented"). In other words, the nanofibers are not randomly spatially arranged with respect to each other. In most instances, the nanofibers described herein grow in a generally perpendicular direction relative to the supporting substrate surface and there is very minimal, if any, branching of individual nanofiber strands.

"Solution" includes various heterogeneous mixtures such as suspensions or dispersions as well as true homogeneous solutions.

In addition, although the term "nanofiber" is typically employed in this disclosure, "nanowire" is also appropriate nomenclature, particularly for the filament structures grown from relatively flat planar substrate surfaces.

The above definitions are provided solely to aid the reader, and should not be construed to have a scope less than that understood by a person of ordinary skill in the art or as limiting the scope of the appended claims.

A stepwise electrochemical deposition process may be used to synthesize the nanofiber structures described herein. Each step typically involves applying a substantially constant current (i.e., galvanostatic) with a predetermined current density to an electrode that is contacting an electrolyte solution. The current applied in each step is held substantially constant for a sufficient period of time to synthesize the desired nanofiber structure.

The process may include at least two electrochemical steps. Although not bound by any theory, it is believed that the first step deposits on the electrode substrate a relatively large number of seed nuclei of the electroactive species present in the electrolyte solution. The step(s) subsequent to the first step grow the nanofiber from the nucleation sites created in the first step. If the electroactive species is an organic monomer, then a polymer is formed at the seed nucleation sites and the subsequent step(s) continue the growth on polymer nanofiber.

Utilizing a current density in the first step that is greater relative to subsequent steps can provide improved nucleation. Furthermore, successive reduction of the applied current density in successive steps enhances formation of uniform nanofibers. In particular, reducing the current density in a stepwise manner prevents the formation of randomly oriented nanofibers. For example, the current density applied in the step subsequent to the first step may be about 20 to about 80% less than that applied in the first step. For each succeeding step, the current density may be further reduced by about 20 to about 80% for each step.

According to certain synthesis schemes, the substantially constant current density in the first step may be from about 0.06 to about 0.1 $mA/cm^2$ for about 10 to about 40 minutes. The substantially constant current density in the second step may be from about 20 to about 80% less than that applied in the second step for about 100 to 240 minutes. And the substantially constant current density in the third step (if desired) may be further reduced by about 20% to about 80% less than that applied in the second step for about 100 to about 240 minutes. If the first step is prolonged, a much higher density of nuclei may be deposited on the surface but nanofibers may not form in the subsequent step(s). Moreover, thick worm-like and highly branched fibers in the excess of a few hundred nanometers begin to randomly form.

The electrochemical deposition may be performed at any temperature that does not deleteriously interfere with the electrochemical processes. For example, the deposition may be performed from about 10° C. to about 60° C.

The substrate upon which the nanofibers are generated typically is a conducting or semiconductor material that can act as an electrode. Illustrative electrode materials include, for example, metals, carbon, conductive metal oxides, semiconductors, conductive plastic materials, and similar materials. Particularly useful electrode materials include an inert metal such as platinum, gold, silver, rhodium, palladium, ruthenium, titanium, or stainless steel; carbon (e.g., glass carbon); a conductive metal oxide such as tin oxide, indium oxide, cadmium oxide, or antimony oxide; a semiconductor (e.g., silicon or germanium); or a separate contiguous body of a base metal or ceramic, glass or plastic material which is coated on at least one surface with the foregoing metal, carbon, conductive metal oxide, semiconductor or conductive plastic materials.

At least one surfactant may be coated on the electrode substrate surface prior to electrodeposition to improve the wetting of the surface by the electrolyte solution. The surfactant molecules may also generate nucleation sites for growing the nanofibers. Any surfactant that can wet metal or similar electrode surfaces is suitable. A suitable surfactant is sodium dodecyl sulfate and similar surfactants.

Substrates with high conductivities are especially suitable. Lower conductivity substrates such as silicon substrates may be modified to increase their conductivity by known techniques such as, for example, doping or surface modification with a highly conductive material. Illustrative highly conductive materials include gold, platinum, or tin oxide.

The nanofiber orientation may be controlled by varying certain process parameters. For example, varying the substrate surface topography can correspondingly alter the nanofiber orientation.

In one instructive illustration, the electrode surface is initially coated with substantially spherical particles, particularly nanometer-sized particles, prior to electrochemical deposition of the nanofiber-forming substance. The substantially spherical particles may be colloidal silica spheres deposited on the electrode surface. Other materials that could provide substantially spherical particles include aluminum oxide and titanium dioxide. The coated electrode surface then is contacted with the solution containing the electroactive species and the system is subjected to the step-wise electrochemical deposition as described above.

The resulting nanofibers grow in a radial pattern, with an orientation perpendicular to the particles' surfaces rather than the electrode surface. The product is a film of three-dimensionally oriented nanofiber networks that are interconnected with each other. Although the networks are interconnected, the individual nanofibers tend to retain a substantially uniform cylindrical shape. Such films have an open structure with nanometer-sized pores and may be especially useful for active filtration membranes.

Unlike previous synthesis of nanofibers a template substrate is not required in the disclosed methods to produce oriented nanofibers. Thus, there is no need to remove a template substrate. In other words, the electrosynthesis described herein results in an array of freestanding oriented nanofibers that do not require support along their longitudinal or elongated axis by a surrounding matrix. Moreover, since the disclosed method is not limited by size constraints imposed by any intricate nanostructure of a template substrate, arrays of relatively large two-dimensional surface areas can be produced. For example, electrode substrates with planar surfaces that extend over relatively large two-dimensional distances (e.g., from a few square centimeters up to tens of square meters) may be used as the substrate for producing arrays that are co-extensive with the electrode substrate surfaces.

The electrosynthesis disclosed herein typically occurs in the liquid phase and involves at least one electrolyte solution. Thus, the described methods can be used with materials that are difficult to volatilize since gas phase processing is not required. Moreover, the majority of useful polymers and ceramic materials are not made by gas phase reactions. Electrochemical deposition equipment also is less expensive compared to gas phase equipment such as chemical vapor deposition devices. The electrolyte solution includes at least one species having an affinity for undergoing electrochemical deposition. The electroactive species may be an inorganic or organic substance. Illustrative substances include organic polymer precursors such as monomers, dimers or oligomers; and metallic ions such as those generated by dissolved metallic compounds. Particularly useful substances are polymer precursors that undergo polymerization during the electrosynthesis to form conducting organic polymers. Conducting polymers have the unique characteristic in that they are not always electrically conductive. They are usually in a conductive state only when at least partially oxidized. Reduced (i.e., neutral) conductive polymers usually have conductivities that are several orders of magnitude lower than their conductivities when oxidized. Conducting polymers typically have the desirable features of rapid response to an applied potential (i.e., high switching speed), durability, and low average power consumption under repetitive potential cycling. Possible conducting polymers that can be synthesized into nanofibers include polyaniline, polythiophene, polypyrrole, polyarylene, polyphenylene, poly(bisthiophenephenylene), conjugated ladder polymer, poly(arylene vinylene), poly(arylene ethynylene), organometallic derivatives thereof, and inorganic derivatives thereof. Possible metals that can be synthesized into nanofibers include gold, silver, platinum, palladium, cobalt, nickel, copper, and iridium and metal oxides such as $TiO_2$, $SnO_2$, $Fe_2O_3$, $Fe_3O_4$, and $Co_2O_3$.

Mixtures of electroactive species could be included in a single electrolyte solution. Electrolyte solutions with varying electroactive species also could be used in succession to produce layered films or composite films. The electrodeposition potential of each electroactive species could be different resulting in a layered film whose successive layers range from the highest potential species at the bottom layer to the lowest potential species at the top layer.

The amount of the electroactive species in the electrolyte solution is not critical and may vary broadly. The minimum amount should be sufficient to sustain nucleation and growth of the nanofibers. Too large a loading of electroactive species may lead to growth of randomly oriented fibers.

The electrolyte solution also may include a secondary electrolyte to increase the electrical conductivity of the solution. The amount of secondary electrolyte may vary, but one particular concentration range is about 0.1 M to about 2 M. Illustrative secondary electrolytes include perchloric acid, sulfuric acid, hydrochloric acid, KCl, NaCl, and NaClO4.

The electrolyte solution typically is a liquid. The carrier liquid for the electrolyte solution may be water, a polar organic liquid solvent such as acetonitrile, or a mixture thereof. Aqueous electrolyte solutions generally are environmentally preferred over organic electrolyte solutions.

The electrochemical deposition can be performed as a batch process or a continuous process. In the case of a continuous process a fresh stream of the electroactive species can be introduced at least intermittently to replenish the depleted electrochemical bath. Alternatively, the electrolyte solution could continuously flow over the electrode surface.

The nanofibers in the arrays usually have substantially uniform shapes and an average diameter of less than about 1 micron. For example, the nanofibers may have a diameter of about 10 to about 200 nm, more particularly about 40 to about 100 nm. The length of nanofibers may vary depending upon the desired resulting film thickness. For example, the nanofibers may have an average length ranging from about 500 to about 10,000 nm, more particularly about 800 to about 5000 nm.

The nanofiber arrays may form a continuous or semi-continuous film across the electrode substrate surface. The film thickness typically corresponds to the length of the nanofibers. The nanofiber films may define a three-dimensional nanoporous structure. The nanofiber arrays or films may be removed from the electrode substrate surface by any suitable technique. For example, the films could be mechanically removed by peeling. Alternatively, the film could be removed by dissolving the substrate. As an illustration, the substrate could be silicon or silicon dioxide that can be dissolved by an acid such as HF or a base such as sodium hydroxide.

The disclosed nanofiber arrays have a number of useful properties. For example, nanofiber arrays made from conducting polymers are redox active materials. In general, redox active materials are materials that can generate an electrical signal in response to a change in physical and electrochemical properties caused by oxidizing and/or reducing the material. For example, the electrical conductivity of a redox active material can be reversibly altered by applying an oxidizing or reducing potential to the electrode made from/or coated with the redox active material. Films of the oriented nanofibers exhibit considerably higher redox currents compared to films of randomly oriented fibers or polymers. The improvement in the redox current reflects the oriented nanofiber arrays' greater effective electrochemical active surface areas that are accessible to the electrolytes.

The oriented nanofiber structures disclosed herein can have a multitude of applications. For example, the conducting polymer nanofiber structures are electroactive materials that can be employed in chemical and biological agent sensing and diagnostic devices; energy conversion and storage devices (e.g., photovoltaic cells, batteries, capacitors, and hydrogen storage); catalysts; multifunctional photonic band gap materials; molecular circuit elements; permeation membranes; semiconducting devices; and light emitting diodes. The high surface area and high porosity associated with the open nanostructures and directionally controllable structure orientation can offer high capacity and efficiency for energy conversion and storage, and reaction catalysis.

One illustration of an application for the oriented nanofiber structures involves synthesizing a nanocomposite structure (e.g., a film) that includes both the nanofiber material and at least one additional substance. Electrodeposition, electroless metal deposition, adsorption, coating of an emulsion or dispersion of the particles, or other techniques can be used to introduce the additional substance into the nanofiber array structure. For example, particles of a second substance may be introduced into nanometer-sized pores in the nanofiber film.

In certain embodiments, particles of the additional substance are loaded or dispersed into the nanoporous structure by electrochemical deposition. The electrochemical deposition of the particles can be accomplished by cycling the potential in a certain range or by potentiostatic or galvanostatic deposition techniques. Such a method offers the ability to precisely control the amount of particles loaded into the nanoporous structure. The nanoporous structures have extremely high surface areas and provide superior support for a substantially uniform dispersion of particles into a three-dimensional network. The high surface area of the nanoporous film structures results in an increased loading capacity for the particles.

Inorganic substances that enhance the electrical properties of a conducting polymer nanofiber film are one class of additional substances that can make distinctive composites or matrices. The inorganic substance could be a metallic complex, a metal, or a metal oxide. The exceptionally high loading capacity of the nanoporous film structures leads to high capacity in catalysts, redox capacitors, and batteries, electrochromic systems, and increased sensitivity in chemical and biological sensors. For example, nanoporous conductive polymer films or nanoporous films loaded with a catalyst (e.g., Pt, Pd, Ru, or $TiO_2$) can be utilized as electrode materials for energy conversion devices such as fuel cells, photovoltaic cells, and hydrogen storage devices. Nanoporous conductive polymer films or nanoporous films loaded with a redox active material can be used as electrode materials for energy storage devices such as batteries and capacitors. Nanoporous conductive polymer films can be used as anion exchange membranes for selective separation and purification due to the reversibility of doping/undoping of anion.

A particularly useful material that can be introduced into the nanofiber films is a mixed valence compound such as a metal hexacyanometallate. Transition metal hexacyanometallates may be represented by the formula $M^1M^2(III)[M^3(II)(CN)_6]$ or $M^2(III)_4[M^3(II)(CN)_6]_3$ wherein $M^2(III)$ is Fe(III), Ru(III), Os(III), Co(III); Cr(III); $M^3(II)$ is Fe(II), Ru(II), Os(II), Co(II); and $M^1$ is an alkali metal cation. Additional useful mixed valence compounds include molybdenum, Cu(II), Ni(II), and Mn(II) ferricyanide. An especially useful metal hexacyanometallate is iron (III) hexacyanoferrate ("FeHCF"). FeHCF is believed to exist in the solid state in two forms: insoluble $Fe_4[Fe(CN)_6]_3$ and soluble $KFe[Fe(CN)_6]$.

For example, composite films containing metal hexacyanometallates can be used in ion-sensitive membranes for determination of alkaline cations; in sensors for methanol, water vapor, and dichloroethane; and for optical measurements. The metal hexacyanometallates-containing structures could be used in electrochromic systems since metal hexacyanometallates (particularly iron (III) hexacyanoferrate) can quickly and reversibly change color upon application of an electric potential. In particular, the metal hexacyanometallates are redox active materials that are very intensely colored in one redox state, but not in another redox state.

Electrochemical deposition of the metal hexacyanometallate can be accomplished by contacting the nanoporous film coated on an electrode substrate with a solution that includes precursors of the metal hexacyanometallate. The solution typically includes a metal(III) ion, a hexacyanometallate ion and a supporting electrolyte. The amount of metal(III) ion and hexacyanometallate ion in the solution depends upon the desired particle loading. For example, the solution may include about 0.001 to about 0.05 M metal(III) ions and about 0.001 to about 0.05 M hexacyanometallate ions.

Applying a voltage or cycling a voltage range applied to the electrode substrate causes the in situ formation and deposition of the metal hexacyanometallate. The specific voltage applied depends upon a number of factors including the type of materials and desired particle loading. The voltage typically is cycled between a high voltage of about 0.5 to about 1.2 V, particularly about 0.6 to about 0.8 V, and a low voltage of about −0.1 to about −0.6 V, particularly about −0.2 to about −0.5 V. The voltage may be cycled at a rate of about 1 to about 200 mV/sec, particularly about 10 to about 100 mV/sec. The voltage cycling is applied for a sufficient period of time to achieve the desired loading of the metal hexacyanometallate particles. Such time periods vary widely, but may generally be about 5 to about 30 minutes.

One or more compounds that generate metal(III) ions when dissolved in solution may be used to make the electrolysis solution. Any desired compound may generally be used to form the metal(III) ion-containing solution as long as it can dissociate metal(III) ion in the solution. Illustrative compounds include metal(III) salts of inorganic acids such as metal(III) chloride, metal(III) sulfate, metal(III) perchlorate, metal(III) nitrate, metal(III) phosphate, or metal(III) pyrophosphate; metal(III) salts of organic acids such as metal(III) oxalate, metal(III) acetate, metal(III) citrate, metal (III) lactate, or metal(III) tartrate; and metal(III) ammonium double salts such as metal(III) ammonium sulfate, metal(III) ammonium oxalate, or metal(III) ammonium citrate.

Any desired compound may generally be used to form the hexacyanometallate ion-containing solution as long as it can provide hexacyanometallate ion in the solution. Illustrative compounds include potassium hexacyanometallate, sodium hexacyanometallate, lithium hexacyanometallate, rubidium hexacyanometallate, and ammonium hexacyanometallate.

The supporting electrolyte may be added for ensuring consistent electrolysis by adjusting the acidity of the solution, increasing the conductivity of the solution and improving the chemical stability of solutes. Exemplary supporting electrolytes include at least one compound selected from inorganic and organic acids such as hydrochloric acid, sulfuric acid, perchloric acid, nitric acid, phosphoric acid, pyrophosphoric acid, hexafluorophosphoric acid, boric acid, tetrafluorophosphoric acid, carbonic acid, oxalic acid, acetic acid, citric acid, lactic acid, tartaric acid, or phthalic acid, and salts of the foregoing inorganic and organic acids with lithium, sodium, potassium, rubidium, calcium, magnesium, ammonium, or tetraalkylammonium. Buffers and pH adjusters may also be added to the electrolysis solution.

The carrier fluid which may be used in preparing the metal(III) ion-containing and hexacyanoferrate(III) ion-containing solution typically is a solvent such as water or a water/acetonitrile mixture, although polar organic solvents such as acetonitrile, tetrahydrofuran, or N,N-dimethylformamide may also be used. Any solvent may be used as long as the iron(III) ion, hexacyanoferrate(III) ion and optional supporting electrolyte are stable in the solvent. The solution typically is made by simply mixing together the various ingredients.

The conducting polymer/inorganic composite films have applications in a variety of fields such as sensors, catalysts, redox capacitors, and secondary batteries. One illustration of an application is in the construction of a biological or chemical sensor that capitalizes on the catalytic properties of the conducting polymer/inorganic composite films.

As described above, amperometric detection of peroxides such as hydrogen peroxide or organic peroxides is becoming increasingly useful. Additional analytes or target compounds of interest for sensors include other electroactive organic compounds such as phenols. Illustrative organic peroxides include organic (hydro)peroxides such as benzoyl peroxide, cumene hydroperoxide, t-butyl hydroperoxide, 2-butanone peroxide, and fatty acid hydroperoxides (e.g., linolenic acid hydroperoxide and lauroyl peroxide).

The conducting polymer/inorganic composite films produced by the methods disclosed herein are especially suitable for constructing sensors for such detection. The films can be deposited on an electrode substrate. An electrolyte solution that includes the analyte of interest is brought into contact with the modified electrode substrate. An electrical potential is applied to the electrode and the analyte undergoes oxidation or reduction that is detected by the electrode. One feature of such sensors is the ability to accurately detect hydrogen peroxide at a low potential such as, for example, about 0.2 to about −0.2 V. Such low potential substantially eliminates the interference from other components in the analyte sample. Another feature is the improved stability of the metal hexacyanometallate coating due to the support provided by the nanoporous matrix. A further characteristic of the sensors is a greater density of sensing sites (i.e., the three-dimensionally distributed metal hexacyanometallate particles) due to the three-dimensional access to the sensing sites by the analyte. Consequently, a greater total sensing surface area is available in a given two-dimensional surface area leading to sufficient sensitivity for miniaturization of the sensor. The analyte detection could be quantitative as well as qualitative.

Figure 7:
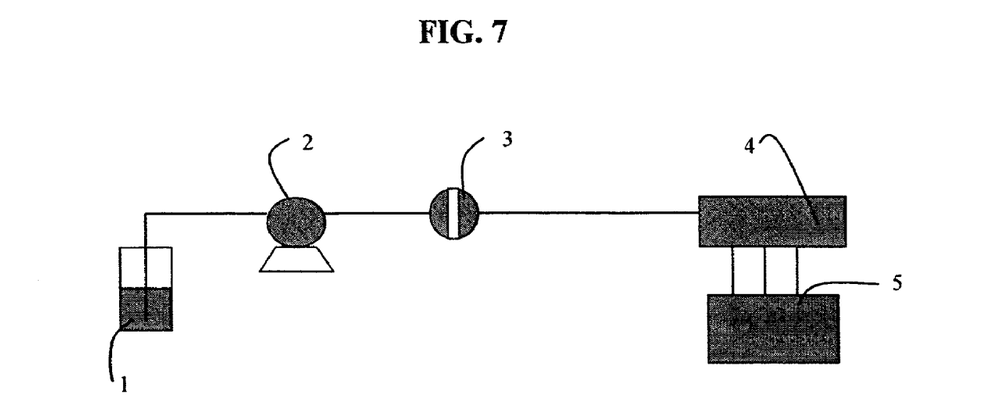
FIG. 7 is a schematic diagram of an amperometric detection system that utilizes a sensor electrode prepared by forming a polyaniline/iron (III) hexacyanoferrate composite film on the electrode surface.

One possible system for amperometric detection is illustrated by the flow injection analysis system shown in FIG. 7. The system includes a vessel 1 containing a carrier fluid mixture (e.g., water with buffering agents). The vessel would be fluidly coupled to a pump 2 that would transport the carrier fluid mixture through a sample injector 3. The sample injector 3 would include an inlet for receiving samples so that they could be mixed with the carrier fluid and an outlet for any waste streams. The resulting sample/carrier solution then is introduced into a microelectrochemical cell 4. A computer 5 is coupled to the microelectrochemical cell 4 to control the microelectrochemical cell 4.

Figure 8:
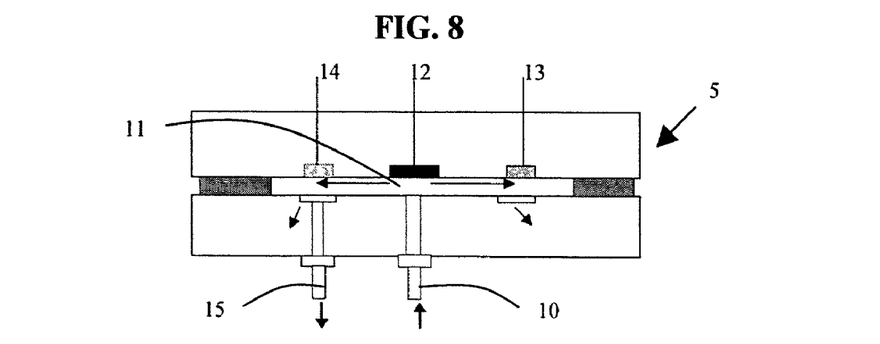
FIG. 8 is a plan sectional view of a microelectrochemical cell used in the system of FIG. 7.

An example of a microelectrochemical cell 4 is depicted in FIG. 8 and in Lin et al., "Integrated Microfluidics/Electrochemical Sensor System for Monitoring of Environmental Exposures to Lead and Chlorophenols" Biomedical Microdevices: 3(4):331–338, 2001. The microelectrochemical cell 4 defines an inlet 10 for receiving the sample/carrier solution, a flow channel 11 that directs the sample/carrier solution over a working electrode 12, a reference electrode 13, and an auxiliary electrode 14, and an outlet 15 for discharging the sample/carrier solution. The working electrode 12 (i.e., the sensor) is a gold (or Pt, glassy carbon, graphite) disc embedded in a polymer plate (e.g., polyetheretherketone ("PEEK")). A transition metal hexacyanometallate/nanoporous conductive polymer film composite modifies the surface of the working electrode 12. The modified working electrode 12 surface is an electron transfer mediator for catalytic reduction or oxidation of target analytes on the electrode surface. The reduction/oxidation current (usually at nA to µA range) is converted into voltage and amplified by a signal amplifier. The reduction/oxidation current is proportional to the analyte concentration in solution.

A biosensor also could be constructed from the modified electrodes disclosed herein by immobilizing an enzyme or other biological reagent on the electrode surface by techniques known in the art as described, for example, in Karyakin et al., "Prussian Blue-Based First-Generation Biosensor, A Sensitive Amperometric Electrode for Glucose", *Anal. Chem.*, 67, 2419–2423, 1995.

Another illustration of an application of the conducting polymer/inorganic composite films is in the separation of cesium ions from a nuclear waste stream or groundwater contaminated with cesium. Transition metal hexacyanometallates are very selective for cesium sorption since the cesium may be substituted for sodium or potassium ions in the transition metal hexacyanometallate (see Rassat et al. "Development of an electrically switched ion exchange process for selective ion separations", *Sep. Purif. Technol.*, 15, 207–222, 1999; Yuehe Lin et al., "Selective Sorption of Cesium Using Self-Assembled Monolayers on Mesoporous Supports (SAMMS)", *Environmental Science & Technology*, 35, 3962–3966, 2001). As mentioned above, the nanoporous matrix provides a greater loading density of transition metal hexacyanometallates leading to a greater separation capacity.

The specific examples described below are for illustrative purposes and should not be considered as limiting the scope of the appended claims.

EXAMPLE 1

Synthesis of Nanofibers

A Pt plate about 1 inch by 1 inch in size was washed thoroughly with ethanol and dried in air. The Pt plate was further rinsed in a 1 wt. % sodium dodecyl sulfate (SDS) solution and dried in air to improve the wetting behavior with water. Electrochemical deposition of polyaniline (PANI) was performed by immersing the Pt plate into an aqueous solution containing 0.5 M aniline monomer and 1.0 M perchloric acid ($HClO_4$). The effective area of the immersed Pt plate was 4.5 $cm^2$. Polyaniline was grown from the surface of the Pt plate by redox polymerization of aniline. The electrochemical experiments were performed on an EG & G Princeton Applied Research model 273 potentiostat/galvanostat controlled by a personal computer via EG & G Princeton Applied Research Model 270 electrochemical software. The experiments for PANI film depositions were made in an H-shape two-compartment cell, with another platinum plate used as the counter electrode. A saturated calomel electrode ("SCE") is located in the cathode part of the H-shape cell. The electrochemical deposition of PANI films was performed by a programmed constant-current method, designed to control the nucleation and growth rate. A step-wise procedure with multi-step changes of current density was employed to continually deposit polyaniline on the surface of the Pt plate. The following procedure was used to prepare the samples: 0.08 $mA/cm^2$ for 0.5 hours, followed by 0.04 $mA/cm^2$ for 3 hours, which was followed by another 3 hours at 0.02 $mA/cm^2$. At the end of each step, the sample was rinsed with deionized water to remove electrolyte solution and monomer attached to the surface of the Pt plate. Besides Pt, other substrates, including Ti, Au, and Si/Au, were also investigated and found to yield similar results.

Figure 1A:
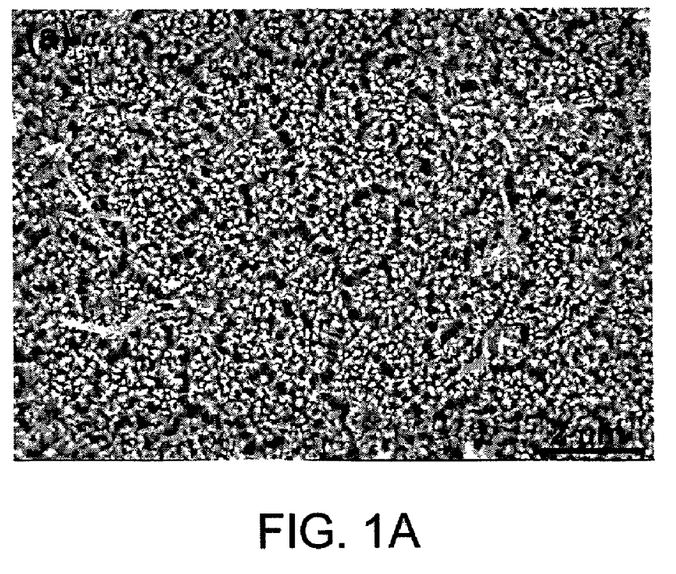
FIGS. 1A–1D are field scanning emission electron microscope (SEM) micrographs of oriented polyaniline nanofibers on a platinum substrate.
Figure 1B:
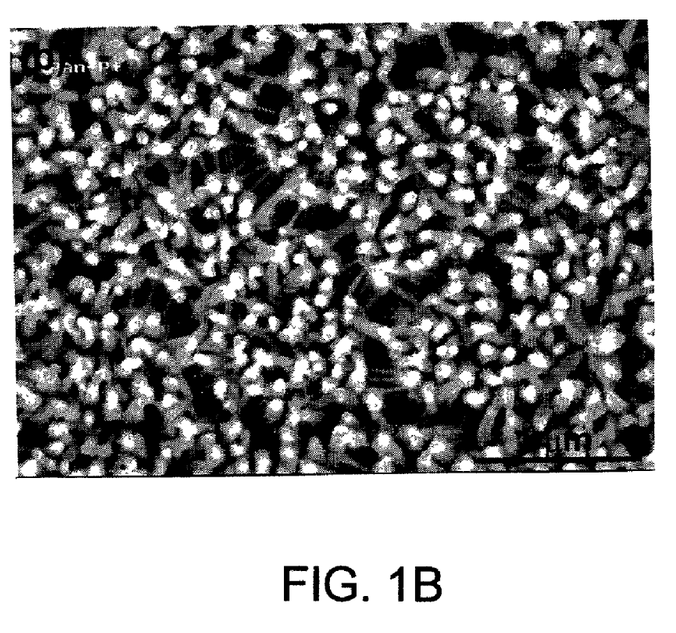
Figure 1C:
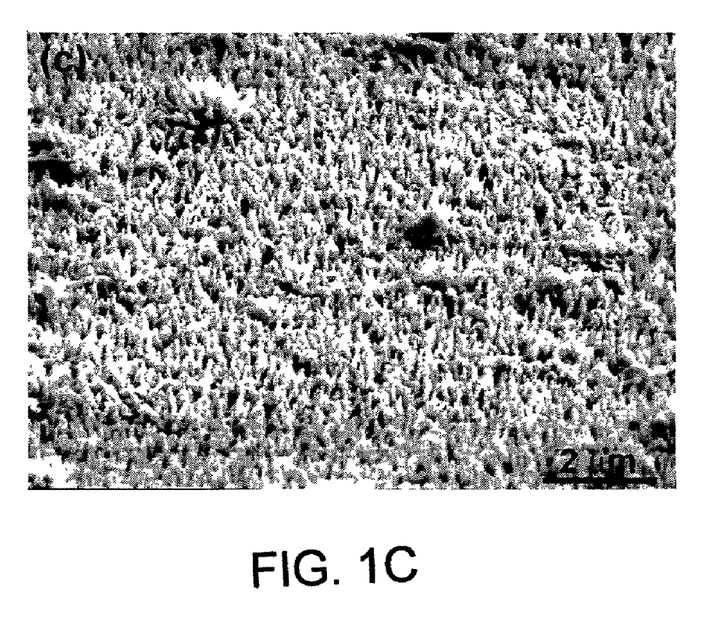
Figure 1D:
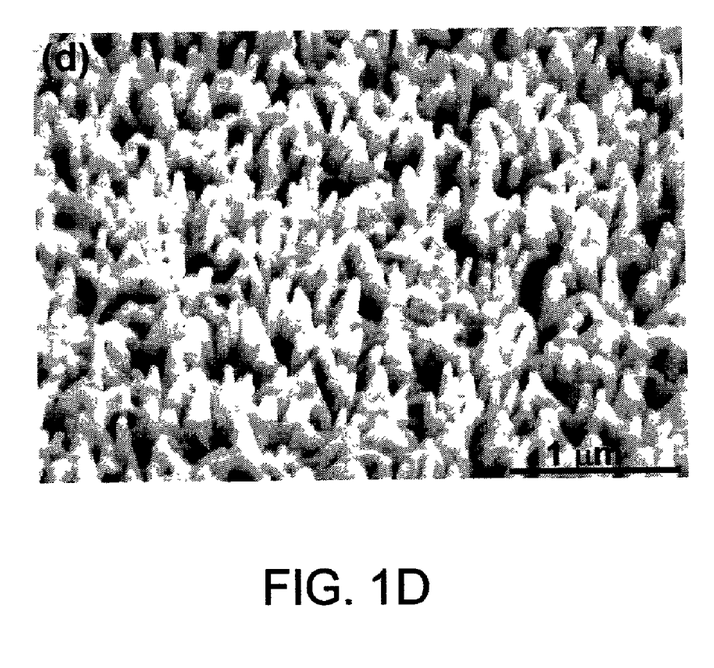

FIGS. 1A–1D show the oriented nanofibers or nanowires produced by the above-described experiment. When viewed from an angle perpendicular to the surface at a lower magnification (FIG. 1A), the film appears to contain uniform white spots all across the surface. At a higher magnification (FIG. 1B), it is revealed that the white spots are actually the tips of uniform nanofibers or nanowires, mostly oriented substantially perpendicular with respect to the substrate. The diameters of the tips range from 50 nm to 70 nm. Some thin filament structures, about 20 nm in diameter, can also be observed at the base of the oriented nanofibers or nanowires. When the sample is tilted, the morphology and the orientation of the nanofibers or nanowires are clearly revealed (FIGS. 1C and 1D). The oriented nanofibers or nanowires are fairly uniform in length and diameter, but the diameter is slightly smaller at the tip position than at the base position. Judging from the tilt angle (about 40°), the nanofibers or nanowires are about 1 μm in length.

Figure 2A:
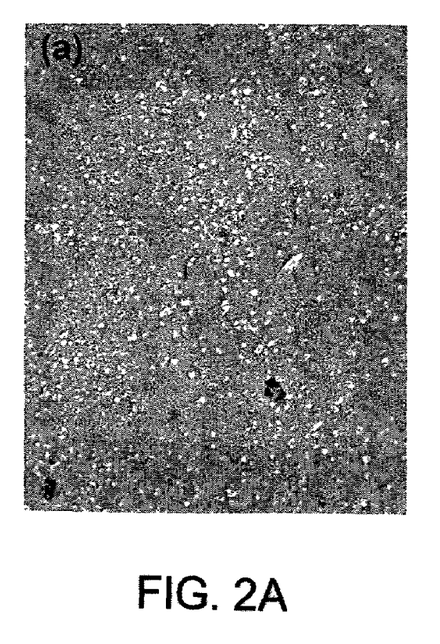
FIG. 2A is a SEM micrograph of polyaniline particles deposited on a platinum substrate after an initial deposition step.

A sample after only the first deposition step (i.e., 0.08 mA/cm$^2$) is shown in FIG. 2A. At this stage, the polymer was deposited on the surface as small particles about 50 nm in diameter. No extended nanofibers were formed yet.

Figure 2B:
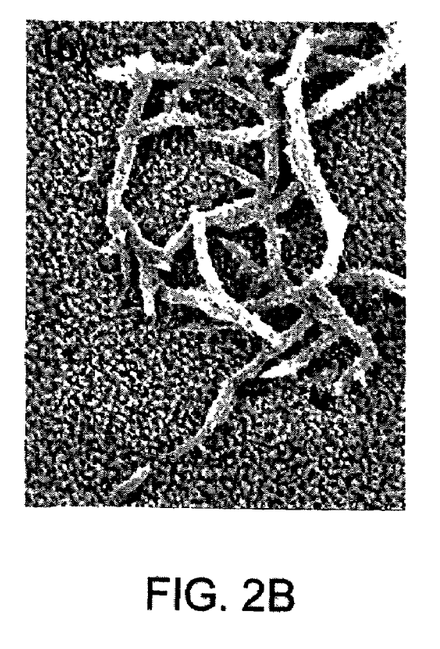
FIG. 2B is a SEM micrograph of polyaniline electrochemically deposited on a platinum substrate without a stepped deposition process.

Controlled comparative experiments were also conducted to study the deposited substance morphology without the step-wise control of the current density. In these comparative examples, the polyaniline films were prepared by electrochemical deposition at 0.08 mA/cm$^2$ for an extended period of time (i.e., for over 5 hours). FIG. 2B shows the result of this comparative sample. A much higher density of nanoparticles can be observed, but there are no oriented nanofibers. Moreover, thick worm-like polymers fibers in the excess of a few hundred nm began to form at many locations.

In order to vary the orientation of the polymer nanofibers, a monolayer of closely packed colloidal silica (0.5 μm in diameter) was deposited on the Pt substrate prior deposition of the aniline. Specifically, after the Pt plate was rinsed with the SDS solution, a droplet of a colloidal silica solution containing about 0.4 wt. % silica particles was placed on the Pt substrate. The SDS treatment improved the wetting behavior of the silica colloidal solution and allowed the droplet to spread over the entire surface of the Pt plate. The excess solution was removed from the substrate by positioning the Pt plate in a vertical position that allowed the excess water to flow off. After drying, the Pt plate with the silica particles was heated in an oven at 110° C. for 0.5 hour. Electrochemical deposition of polyaniline was conducted using the same procedure as described above.

Figure 3A:
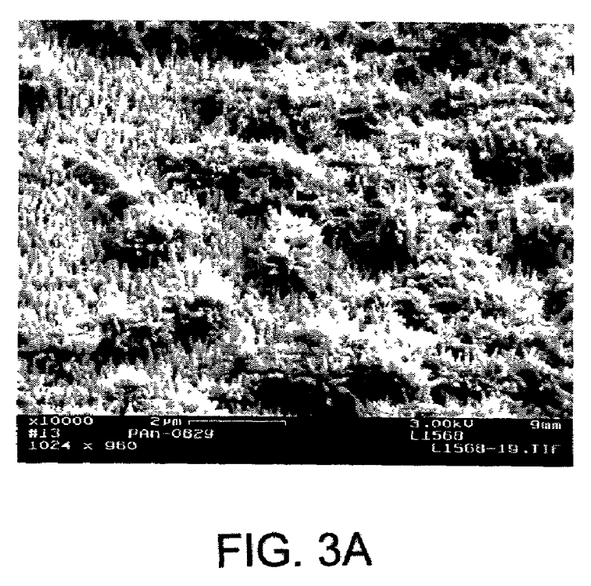
FIGS. 3A–3D are SEM micrographs of oriented polyaniline nanofibers deposited on colloidal silica particles.
Figure 3B:
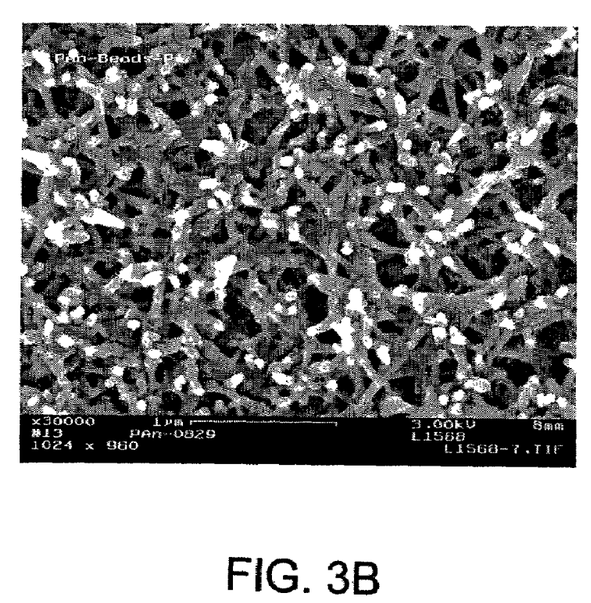
Figure 3C:
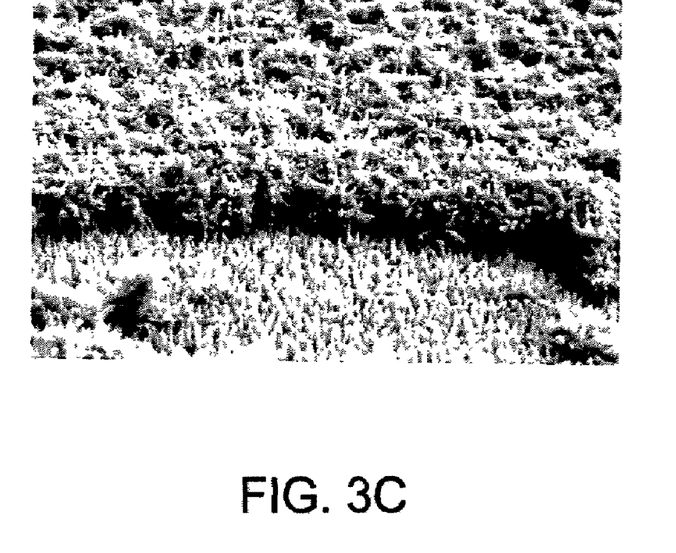
Figure 3D:
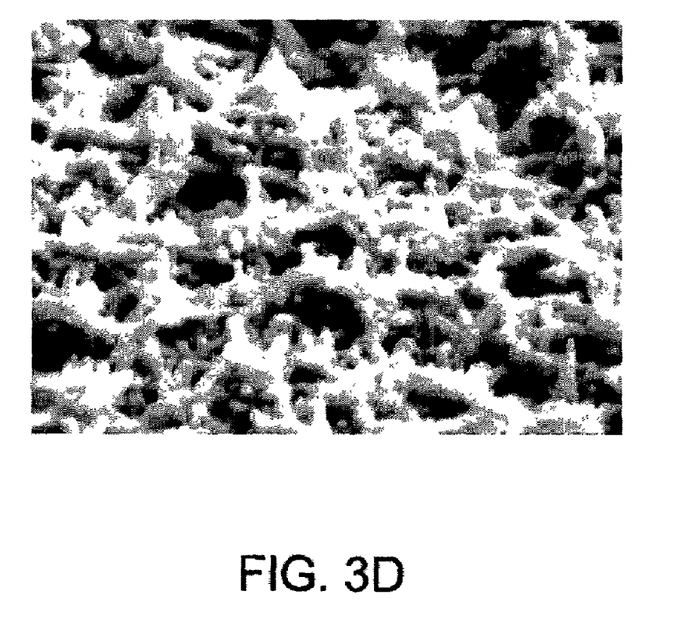

FIG. 3A shows the results in a substrate area where the silica particles were not closely packed. The surface roughness induced by the presence of the silica particles and the radial growth of the polyaniline nanofibers is clearly visible. FIG. 3C depicts the morphology of the nanofibers across the edge of the silica monolayer. Close to the front where there are no silica particles, the polymers are oriented vertically. But on top of the silica particles, the nanofiber orientation is disrupted and randomly connected. In a substrate area occupied by a monolayer of densely packed silica spheres, the radial growth of polymer nanowires overlaps and forms three-dimensionally interconnected polymer networks (see FIGS. 3B and 3D).

Figure 4:
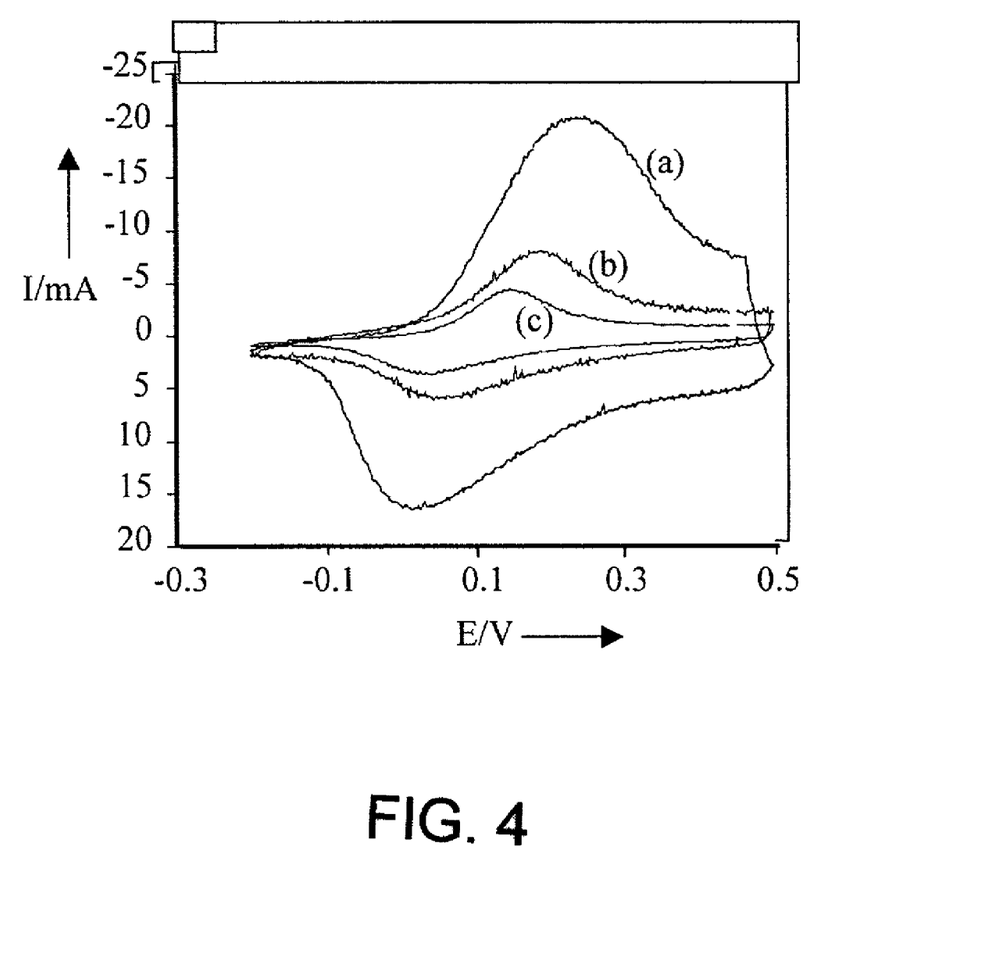

The same instrument and samples were used for voltammetry experiments using SCE as the reference electrode. Cyclic voltammograms as shown in FIG. 4 were collected in 1 M HClO$_4$ and at a sweep rate of 50 mV/s. Curve (a) represents the unidirectionally oriented nanofibers on the Pt substrate, (b) represents the randomly oriented nanofibers on the silica spheres, and (c) represents a conventional polyaniline film deposited without the step-wise current process (i.e., with a constant current). All the samples demonstrated electrochemical activity characterized by the typical reduction and oxidation peaks. However, the unidirectionally oriented nanofibers have considerably higher redox currents compared to those of randomly oriented fibers, which in turn have a higher redox current than the samples prepared with a constant current. The difference in the redox currents reflects the effective electrochemical active surface areas that are accessible to the electrolytes. Based on these results, it is apparent that the substantially parallel oriented nanowires have the highest effective surface area, which is desirable for high efficiency and sensitivity devices.

PANI nanofibers were also deposited on silicon wafers following the procedure described below. The silicon wafers were supersonically cleaned for 15 minutes in 2-isopropanol to remove any trace organic residue. The pre-cleaned silicon wafers were immersed in 0.1 M KOH for 2 minutes and 0.1 M HNO$_3$ for 10 minutes. The wafers were subsequently washed with excess water. The wafers then were dried under flowing N$_2$ for a minimum of 2 hours prior to coating with gold via sputtering. After the gold sputtering, the surface of the wafer was coated with a 1 wt. % solution of sodium dodecyl sulfate. The wafer was dried in an oven at 110° C. for 0.5 hour. The PANI electrochemical deposition synthesis described above was then performed on the prepared silicon wafers resulting in the similar formation of oriented PANI nanofibers.

EXAMPLE 2

Synthesis of Composite Films

A polyaniline nanoporous film was synthesized according to Example 1, except that the second and third constant current density steps were maintained for four hours rather than three. In addition, the working electrode was a glassy carbon disk with a surface area of 0.14 cm$^2$ (commercially available from Bioanalytical Systems) rather than a Pt substrate.

FeHCF was electrodeposited on the polyaniline-modified electrode by immersing the electrode in a 0.1 M KCl aqueous solution containing a 0.01 M equimolar mixture of FeCl$_3$ and K$_3$Fe(CN)$_6$. The electrode potential was cycled between −0.20 and +0.80 V at 50 mV/s in the mixed solution of 0.1 M KCl, 0.01 M FeCl$_3$ and 0.01 M K$_3$Fe(CN)$_6$.

The surfaces of the polyaniline/FeHCF-modified electrode were investigated with SEM. The SEM micrographs indicated that FeHCF was deposited into the nanoporous polyaniline matrix and at least partially filled the nanopores. The surfaces of the polyaniline/FeHCF-modified electrode were also investigated with x-ray photoelectron spectrometry ("XPS"). The XPS spectra clearly showed Fe peaks confirming the deposition of FeHCF into the polyaniline matrix.

The synthesis and testing of the polyaniline/FeHCF films were performed using a CH Instruments model CHI 660 potentiostat controlled by a personal computer and the electrochemical software. The experiments were made in a one-compartment cell containing three electrodes. The potential of the working electrode (i.e., the polyaniline-coated electrode) was always measured against the Ag/AgCl reference electrode. The counter electrode was a platinum wire.

EXAMPLE 3

Sensor

A polyaniline/FeHCF-modified glassy carbon electrode made as described above in Example 2 was used to detect the presence of hydrogen peroxide by sensing catalytic reduction of hydrogen peroxide. The amperometric detection was conducted using the flow injection analysis system shown in FIG. 7. The particular system included a peristaltic pump, a Rheodane 7125 injector with a 50-µL sample loop, an interconnecting polytetrafluorethylene tubing, and a thin-layer electrochemical flow cell. Flow injection/amperometric measurements were conducted with a CH Instruments model CHI 824 electrochemical detector. The working electrode is the glassy carbon electrode embedded in a PEEK plate. A constant potential of 0.1 V was applied to the electrode. The flow rate of the carrier solution (0.1 M KCl, 0.05 M acetate buffer (pH 6.0) was 0.5 mL/min. A 50-uL sample containing hydrogen peroxide was injected from the injection valve into the carrier solution. Hydrogen peroxide was reduced when sample flowed through the electrode surface. The reducing current (signal) was used to measure the concentration of hydrogen peroxide. The hydrogen peroxide concentration varied as indicated in FIG. 5.

Figure 5:
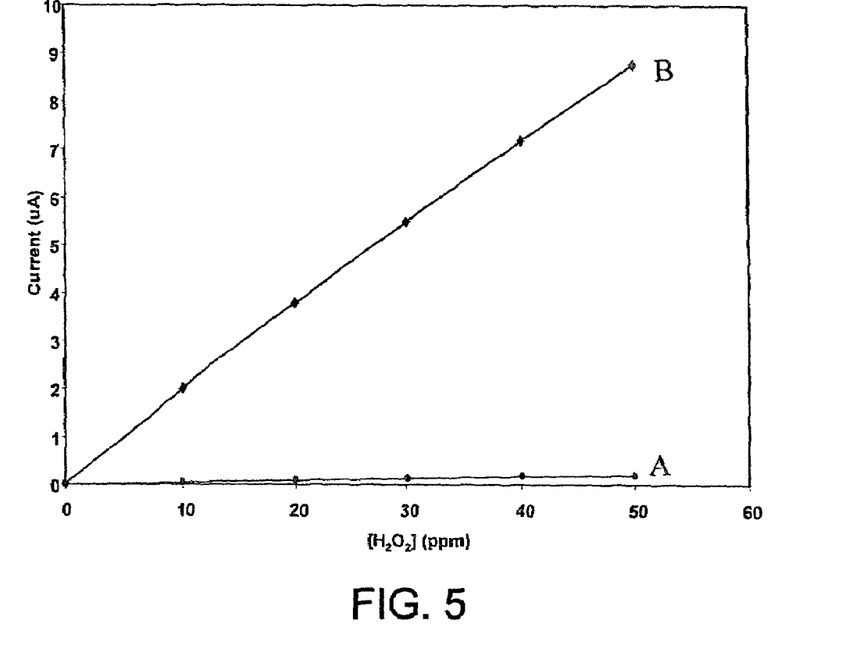
FIG. 5 is a graph showing currents produced by a sensor electrode as a result of the catalytic reduction of hydrogen peroxide at the surface of the sensor electrode. The sensor electrode was prepared by forming a polyaniline/iron (III) hexacyanoferrate composite film on the electrode surface.

Curve B of FIG. 5 shows the currents generated by the catalytic reduction of hydrogen peroxide by the working electrode. Curve A of FIG. 5 shows the currents generated by the catalytic reduction of hydrogen peroxide by an electrode that was modified by forming a polyaniline film on the electrode surface that did not include FeHCF. These results clearly indicate that FeHCF deposited into the nanoporous PANI film acts as an electron transfer mediator between the electrode and the hydrogen peroxide. Without deposition of FeHCF, the PANI-modified electrode has a very low response to hydrogen peroxide at a low potential. With deposition of FeHCF, the electrode has a high response to hydrogen peroxide at a low potential. Application of such a low electrode potential (0.10 V) can eliminate the interference from anodic discharge of many components often present in analyte solutions.

Figure 6:
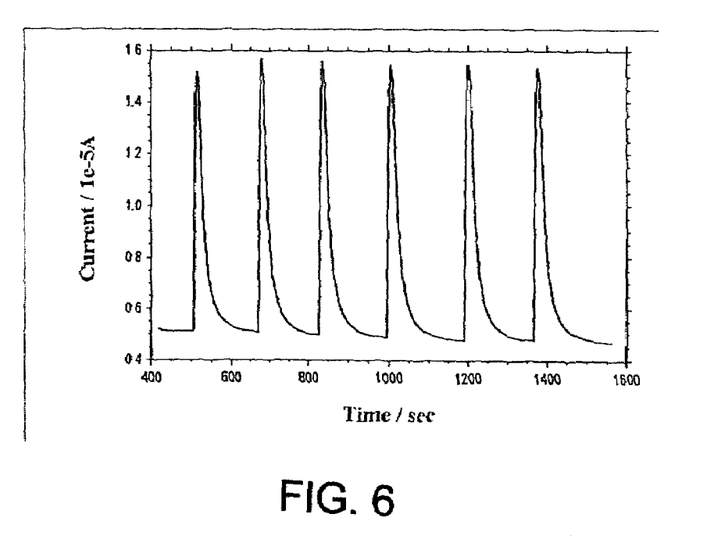
FIG. 6 is a graph showing the response of the sensor electrode used in FIG. 5 to six repetitive injections of 50 µL hydrogen peroxide solution having a hydrogen peroxide concentration of 50 ppm.

FIG. 6 shows the polyaniline/FeHCF-modified glassy carbon electrode response to six injections of 50 ppm hydrogen peroxide solution. The operating conditions were the same as described above in connection with FIG. 5. Well-defined peaks are observed at a low potential (0.10 V) indicating the reproducibility of the sensor.

Having illustrated and described the principles of the disclosed methods and substrates with reference to several embodiments, it should be apparent that these methods and substrates may be modified in arrangement and detail without departing from such principles.

What is claimed is:

1. A method of producing an array of oriented nanofibers, comprising:
   forming a solution that includes at least one electroactive species;
   contacting the solution and an electrode substrate; and
   applying a current to the electrode substrate that includes at least a first step of applying a first substantially constant current density for a first time period and a second step of applying a second substantially constant current density for a second time period, wherein the first substantially constant current density is greater than the second substantially constant current density; and
   wherein the first time period and second time period are of sufficient duration to electrically deposit on the electrode substrate an array of oriented nanofibers produced from the electroactive species.

2. The method of claim 1, wherein the electrode substrate lacks an oriented nanostructure.

3. The method of claim 1, wherein the solution comprises an aqueous solution and the at least one electroactive species is an electroactive organic monomer.

4. The method of claim 3, wherein the organic monomer polymerizes on the electrode substrate to form the oriented nanofibers.

5. The method of claim 4, wherein the oriented nanofibers comprise a conducting polymer.

6. The method of claim 5, wherein the conducting polymer comprises a polyaniline, polythiophene, polypyrrole, polyarylene, polyphenylene, poly(bisthiophenephenylene), conjugated ladder polymer, poly(arylene vinylene), poly(arylene ethynylene), organometallic derivative thereof, or inorganic derivative thereof.

7. The method of claim 1, wherein the contacting of the solution with the electrode substrate comprises immersing the electrode substrate in a vessel holding the solution.

8. The method of claim 1, further comprising at least one additional step of applying to the electrode substrate at least one additional substantially constant current density for an additional time period.

9. The method of claim 1, wherein the first step comprises applying the first substantially constant current density of about 0.06 to about 0.1 mA/cm$^2$ for about 10 to about 40 minutes, and the second step comprises applying the second substantially constant current density of about 0.03 to about 0.05 mA/cm$^2$ for about 100 to about 240 minutes.

10. The method of claim 1, wherein the array of oriented nanofibers comprises a nanoporous structure, the method further comprising electrodepositing at least one substance within the nanopores of the nanoporous structure to form a film.

11. The method of claim 10, wherein the oriented nanofibers comprise a conducting polymer and the at least one substance comprises an inorganic material.

12. The method of claim 11, wherein the inorganic material comprises a metal hexacyanometallate.

13. The method of claim 12, wherein the metal hexacyanometallate comprises $M^1M^2(III)[M^3(II)(CN)_6]$ or $M_2(III)_4[M^3(II)(CN)_6]_3$ wherein $M^2(III)$ is Fe(III), Ru(III), Os(II), or Co(III); $M^3(II)$ is Fe(II), Ru(II), Os(II), or Co(II); and $M^1$ is an alkali metal cation.

14. The method of claim 13, wherein the metal hexacyanometallate comprises iron (III) hexacyanoferrate.

15. The method of claim 12, wherein the conducting polymer comprises polyaniline and the metal hexacyanometallate comprises iron (III) hexacyanoferrate.

16. The method of claim 1, wherein the oriented nanofibers are substantially unidirectionally oriented.

17. The method of claim 16, wherein the unidirectionally oriented nanofibers are substantially perpendicular to a plane formed by the substrate surface.

18. The method of claim 1, wherein the oriented nanofibers are three-dimensionally oriented.

19. The method of claim 1, wherein the nanofibers have an average diameter of less than about 1 micron and an average length of about 500 to about 10,000 nm.

20. The method of claim 1, further comprising increasing the electrical conductivity of the electrode substrate prior to contacting the solution and the electrode substrate.

21. The method of claim 1, further comprising applying a surfactant to the electrode substrate prior to contacting the solution and the electrode substrate.

22. The method of claim 1, wherein the oriented nanofibers have a substantially uniform cylindrical shape with substantially no branching.

23. The method of claim 1, wherein the electroactive species comprises an electroactive organic monomer, and applying the first substantially constant current density for the first time period causes seed nuclei comprising the electroactive organic monomer to be deposited on the electrode substrate.

24. The method of claim 23, wherein applying the second substantially constant current density for the second time period causes polymerization of the electroactive organic monomer to grow nanofibers from the deposited seed nuclei.

25. The method of claim 24, further comprising at least one additional step of applying to the electrode substrate at least one additional substantially constant current density for an additional time period.

26. The method of claim 24, wherein the nanofibers comprise a conducting polymer.

27. The method of claim 26, wherein the conducting polymer comprises polyaniline, polythiophene, polypyrrole, polyarylene, polyphenylene, poly(bisthiophenephenylene), a conjugated ladder polymer, poly(arylene vinylene), poly(arylene ethynylene), an organometallic derivative thereof, or an inorganic derivative thereof.

28. The method of claim 24, further comprising electrodepositing at least one substance into the array of oriented nanofibers.

29. The method of claim 28, wherein the at least one substance comprises a metallic material.

30. The method of claim 29, wherein the metallic material comprises a metal hexacyanometallate.

31. The method of claim 30, wherein the metal hexacyanometallate comprises $M^1M^2(III)[M^3(II)(CN)_6]$ or $M_2(III)_4[M^3(II)(CN)_6]_3$ wherein $M^2(III)$ is Fe(III), Ru(II), Os(III), or Co(III); $M^3(II)$ is Fe(II), Ru(II), Os(II), or Co(II); and $M^1$ is an alkali metal cation.

32. The method of claim 31, wherein the metal hexacyanometallate comprises iron (III) hexacyanoferrate.

33. The method of claim 1, further comprising depositing substantially spherical particles on the electrode substrate prior to applying the first and second substantially constant current densities to the electrode substrate.

34. The method of claim 33, wherein the substantially spherical particles comprise colloidal silica, $TiO_2$, or $Al_2O_3$.

35. The method of claim 33, wherein the oriented nanofibers are three-dimensionally oriented.

36. The method of claim 33, wherein the oriented nanofibers have an average diameter of less than about 1 micron and an average length of about 500 to about 10,000 nm.

37. The method of claim 33, wherein the nanofibers form a three-dimensionally oriented network defining nanometer-sized pores.

38. The method of claim 37, further comprising introducing at least one substance into the three-dimensionally oriented network.

39. The method of claim 38, wherein the at least one substance comprises a metallic material.

40. The method of claim 39, wherein the metallic material comprises a metal hexacyanometallate.

41. The method of claim 40, wherein the metal hexacyanometallate comprises $M^1M^2(III)[M^3(II)(CN)_6]$ or $M_2(III)_4[M^3(II)(CN)_6]_3$ wherein $M^2(III)$ is Fe(III), Ru(III), Os(III), or Co(III); $M^3(II)$ is Fe(II), Ru(II), Os(II), or Co(II); and $M^1$ is an alkali metal cation.

42. The method of claim 41, wherein the metal hexacyanometallate comprises iron (III) hexacyanoferrate.

43. A method of producing an array of oriented nanofibers, comprising:
    forming a solution that includes at least one electroactive species;
    contacting the solution and an electrode substrate; and
    applying to the electrode substrate an electrical current regime that includes successive steps of successively reduced current densities under conditions sufficient to electrochemically deposit an array of oriented nanofibers on the electrode substrate, wherein the oriented nanofibers are produced from the electroactive species.

44. The method of claim 43, wherein the array of oriented nanofibers comprises a nanoporous structure, the method further comprising electrodepositing at least one substance within the nanopores of the nanoporous structure to form a film.

45. The method of claim 44, wherein the oriented nanofibers comprise a conducting polymer and the at least one substance comprises an inorganic material.

46. The method of claim 45, wherein the inorganic material comprises a metal hexacyanometallate.

47. The method of claim 46, wherein the conducting polymer comprises polyaniline and the metal hexacyanometallate comprises iron (III) hexacyanoferrate.

48. The method of claim 43, further comprising depositing substantially spherical particles on the electrode substrate prior to applying first and second substantially constant current densities to the electrode substrate.

49. The method of claim 43, wherein the oriented nanofibers are substantially unidirectionally oriented.

50. The method of claim 43, wherein the oriented nanofibers are three-dimensionally oriented.

51. A method of producing an array of oriented nanofibers, comprising:
    depositing substantially spherical particles on an electrode substrate;
    forming a solution that includes at least one electroactive species;
    contacting the solution and the electrode substrate; and
    applying a current to the electrode substrate that includes at least a first step of applying a first substantially constant current density for a first time period and a second step of applying a second substantially constant current density for a second time period, wherein the oriented nanofibers are produced from the electroactive species.

52. The method of claim 51, wherein the substantially spherical particles comprise colloidal silica, $TiO_2$, or $Al_2O_3$.

53. The method of claim 51, wherein the oriented nanofibers are three-dimensionally oriented.

54. The method of claim 51, wherein the oriented nanofibers have an average diameter of less than about 1 micron and an average length of about 500 to about 10,000 nm.

55. The method of claim 51, wherein the nanofibers form a three-dimensionally oriented network defining nanometer-sized pores.

* * * * *